United States Patent
Ayukawa (10) Patent No.: US 10,812,669 B2
(45) Date of Patent: Oct. 20, 2020

(54) RECOGNITION SYSTEM OF PERSON CARRYING AWAY OUTPUT MATTER OF IMAGE FORMING APPARATUS, RECOGNITION METHOD, AND STORAGE MEDIUM STORING RECOGNITION PROGRAM

(71) Applicant: Konica Minolta, Inc., Tokyo (JP)

(72) Inventor: Shoichi Ayukawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/283,100

(22) Filed: Feb. 22, 2019

(65) Prior Publication Data
US 2019/0297201 A1    Sep. 26, 2019

(30) Foreign Application Priority Data

Mar. 22, 2018   (JP) .................................. 2018-053832

(51) Int. Cl.
*G06F 3/12* (2006.01)
*H04N 1/00* (2006.01)
*H04N 1/44* (2006.01)

(52) U.S. Cl.
CPC ..... *H04N 1/00326* (2013.01); *H04N 1/00251* (2013.01); *H04N 1/00413* (2013.01); *H04N 1/00477* (2013.01); *H04N 1/00697* (2013.01); *H04N 1/00732* (2013.01); *H04N 1/442* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 7,460,692 B2 * | 12/2008 | Mizutani | .................. | G07C 9/37 382/118 |
| 10,194,037 B2 * | 1/2019 | Tomofuji | .............. | G06F 3/1203 |
| 2007/0024896 A1 * | 2/2007 | Bounar | .................. | G06F 3/1204 358/1.15 |
| 2011/0087535 A1 * | 4/2011 | Yoshizawa | ............. | G06Q 20/20 705/14.26 |
| 2019/0018621 A1 * | 1/2019 | Akahira | ................ | G06F 3/1204 |

FOREIGN PATENT DOCUMENTS

JP    2008-221626 A    9/2008

OTHER PUBLICATIONS

Machine translation of Japanese Pat. Publ. No. 2008-221626 to Matsuba, published on Sep. 2008.*

* cited by examiner

*Primary Examiner* — Paul F Payer (74) *Attorney, Agent, or Firm* — Lucas & Mercanti, LLP (57) ABSTRACT

A recognition system including: a specifier that specifies a person who approaches an image forming apparatus using predetermined user information; a memory that stores the person specified by the specifier; a recognizer that recognizes at least any of the stored persons as a candidate who carries away a recording medium on which an image is formed on the basis of a user's print job; and a notificator that notifies a message regarding carrying away of the recording medium on which the image is formed to the recognized candidate.

17 Claims, 7 Drawing Sheets

RECOGNITION SYSTEM OF PERSON CARRYING AWAY OUTPUT MATTER OF IMAGE FORMING APPARATUS, RECOGNITION METHOD, AND STORAGE MEDIUM STORING RECOGNITION PROGRAM

CROSS-REFERENCE TO RELATED APPLICATION

Japanese patent application No. 2018-053832 filed on Mar. 22, 2018, including description, claims, drawings, and abstract the entire disclosure is incorporated herein by reference in its entirety.

BACKGROUND

1. Technological Field

The present invention relates to a recognition system of a person carrying away an output matter of an image forming apparatus, a recognition method, and a non-transitory computer-readable storage medium storing a recognition program.

2. Description of the Related Art

In a company office or the like, a system that enables a plurality of users to use an image forming apparatus by connecting a plurality of user terminals to the image forming apparatus such as a MFP (multi-function peripheral) or the like via a network is established.

However, when a user who executed a print job acquires a printed matter as an output matter of the image forming apparatus from a sheet discharge tray of the image forming apparatus, the user may erroneously carry away the other person's printed matter by a later print job discharged to the same sheet discharge tray along with the his own printed matter in some cases. In addition, in some cases, a user who executed a later print job may erroneously take the other person's printed matter by a former print job along with the his own printed matter without noticing that the other person's printed matter remains in the sheet discharge tray.

A technique for urging the user who carries away the other person's printed matter to return the printed matter to the other person as described above is discussed in Unexamined Japanese Patent Publication No. 2008-221626. That is, history information of a print job executed by a user who logs in the image forming apparatus is displayed, and a query message is notified to a person or the like who executed a print job for outputting printed matter to the same sheet discharge tray as a sheet discharge tray which the print job designated by the user as a query target out of the history information has been discharged. As a result, it is possible to retrieve the printed matter without displaying the history information of the other person's print job.

SUMMARY

However, a person who did not execute the print job can also touch the printed matter placed on the sheet discharge tray. Therefore, a person who has a possibility of carrying away the other person's printed matter is not limited to the user who executed the print job, but all the persons positioned near the image forming apparatus may also take the other person's printed matter. There exists a problem that the technique described in Unexamined Japanese Patent Publication No. 2008-221626 fails to cope with a case where a person who carried away the other person's printed matter is not the user remaining in the history due to execution of the print job.

The present invention has been made to address such the problem. That is, it is possible to specify those who possibly carried away the other person's printed matter without omission and urge them to return or the like.

To achieve at least any one of the abovementioned objects, according to an aspect of the present invention, a recognition system a person carrying away output matter of an image forming apparatus, a recognition method, and a non-transitory computer-readable storage medium storing a recognition program a recognition program reflecting one aspect of the present invention comprises the followings.

A recognition system of a person carrying away an output matter of an image forming apparatus, comprising: a specifier that specifies a person who approaches the image forming apparatus using predetermined user information; a memory that stores said person specified by said specifier; a recognizer that recognizes at least any of said persons stored in said memory as a candidate who has carried away an output matter on which an image is formed by said image forming apparatus on the basis of a user's print job; and a notificator that notifies a message regarding a fact that said output matter on which the image is formed by said image forming apparatus has been carried away to said candidate recognized by said recognizer.

A recognition method of a person carrying away an output matter of an image forming system, the method comprising: (a) specifying a person who approaches said image forming system using predetermined user information; (b) storing said specified person; (c) recognizing at least any of said stored persons as a candidate who has carried away an output matter on which an image is formed by an image forming apparatus on the basis of a print job of a user; and (d) notifying a message regarding a fact that said output matter has been carried away to said recognized candidate.

A non-transitory computer-readable storage medium storing a recognition program of a person carrying away an output matter of an image forming apparatus, the program causing a computer to perform: (a) specifying a person who approaches said image forming system using predetermined user information; (b) storing said specified person; (c) recognizing at least any of said stored persons as a candidate who has carried away an output matter on which an image is formed by said image forming apparatus on the basis of a print job of a user; and (d) notifying a message regarding a fact that said output matter has been carried away to said recognized candidate.

The objects, features, and characteristics of this invention other than those set forth above will become apparent from the description given herein below with reference to preferred embodiments illustrated in the accompanying drawings.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

A recognition system of a person carrying away an output matter in an image forming apparatus, a recognition method, and a recognition program according to an embodiment of the present invention will now be described with reference to the accompanying drawings. Note that like reference numerals denote like elements throughout the drawings, and they will not be repeatedly described. In addition, dimensions or scales of some elements in the drawings may be exaggerated differently from real ones for convenient description purposes.

Figure 1:
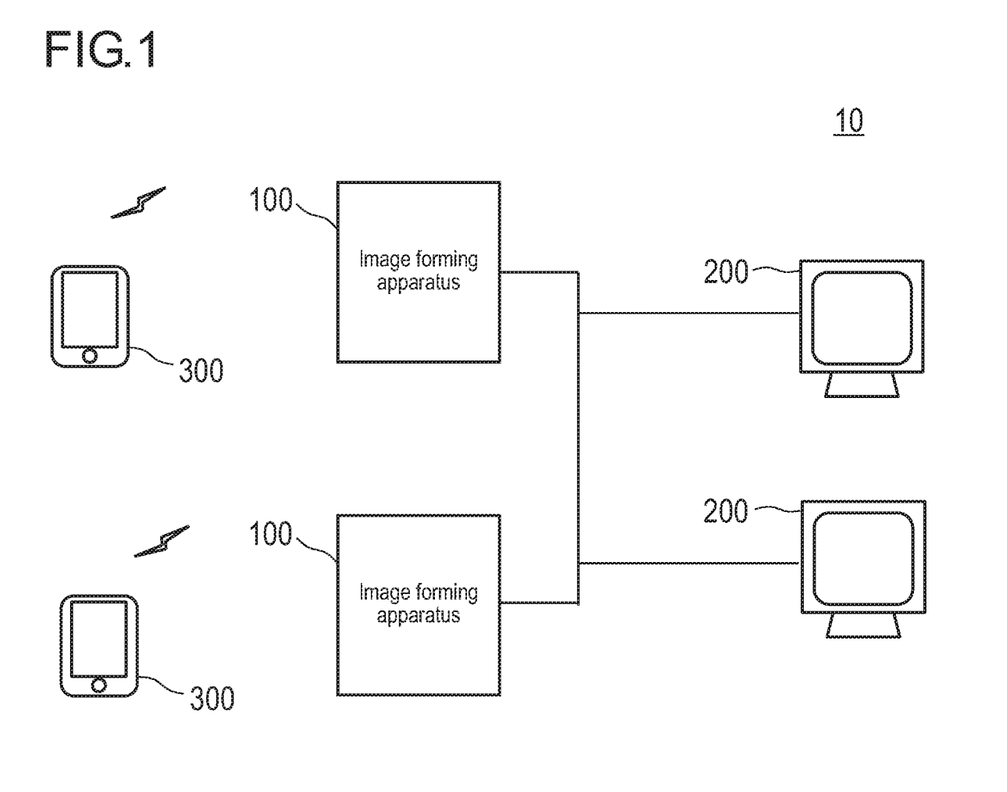
FIG. 1 is a schematic diagram illustrating an image forming system having an image forming apparatus in which a recognition system of a person carrying away an output matter is integrated.

FIG. 1 is a schematic diagram illustrating an image forming system having the image forming apparatus in which the recognition system of the person carrying away the output matters integrated. The recognition system of the person carrying away the output matter in the image forming apparatus (hereinafter, simply referred to as "recognition system") may be integrated in the image forming apparatus 100 by installing a program for implementing functions of the recognition system in the image forming apparatus and allowing hardware of the image forming apparatus 100 to operate depending on the program to implement the functions of the recognition system. In the following description, it is assumed that the recognition system is integrated in the image forming apparatus 100. However, the recognition system may also be a device separate from the image forming apparatus 100. The image forming system 10 may include only the image forming apparatus 100.

The image forming system 10 has, for example, a plurality of image forming apparatuses 100, a plurality of personal computers 200 as user terminals, and a plurality of user's mobile terminals 300. The personal computers 200 and the mobile terminals 300 constitute terminals. Note that, in the following description, the personal computer 200 will be referred to as a "terminal" to distinguish from the mobile terminal 300. The image forming apparatus 100 and the terminal 200 are connected to each other communicably via a network. The image forming apparatus 100 and the mobile terminal 300 are connected to each other communicably by pairing using a near field wireless system such as Bluetooth (registered trademark).

Each user allocated with the terminal 200 transmits a print job from the terminal 200 to any one of the image forming apparatuses 100, causes the image forming apparatus 100 to execute the print job and outputs a printed matter which is a recording medium having an image. The recording medium includes a sheet, a resin film, and the like. The printed matter constitutes an output matter. In the following description, it is assumed that the recording medium is the sheet.

The print job is a generic name of print commands to the image forming apparatus 100, and includes print data and a print setting. The print data is data of a document to be printed, and the print data may include various data such as image data, vector data, and text data. Specifically, the print data may be PDL (page description language) data, PDF (portable document format) data, or TIFF (tagged image file format data). The print setting is a setting regarding image formation on a sheet, and includes various settings such as the number of pages, the number of copies, a sheet type, selection of color or monochrome, and page allocation.

Figure 2:
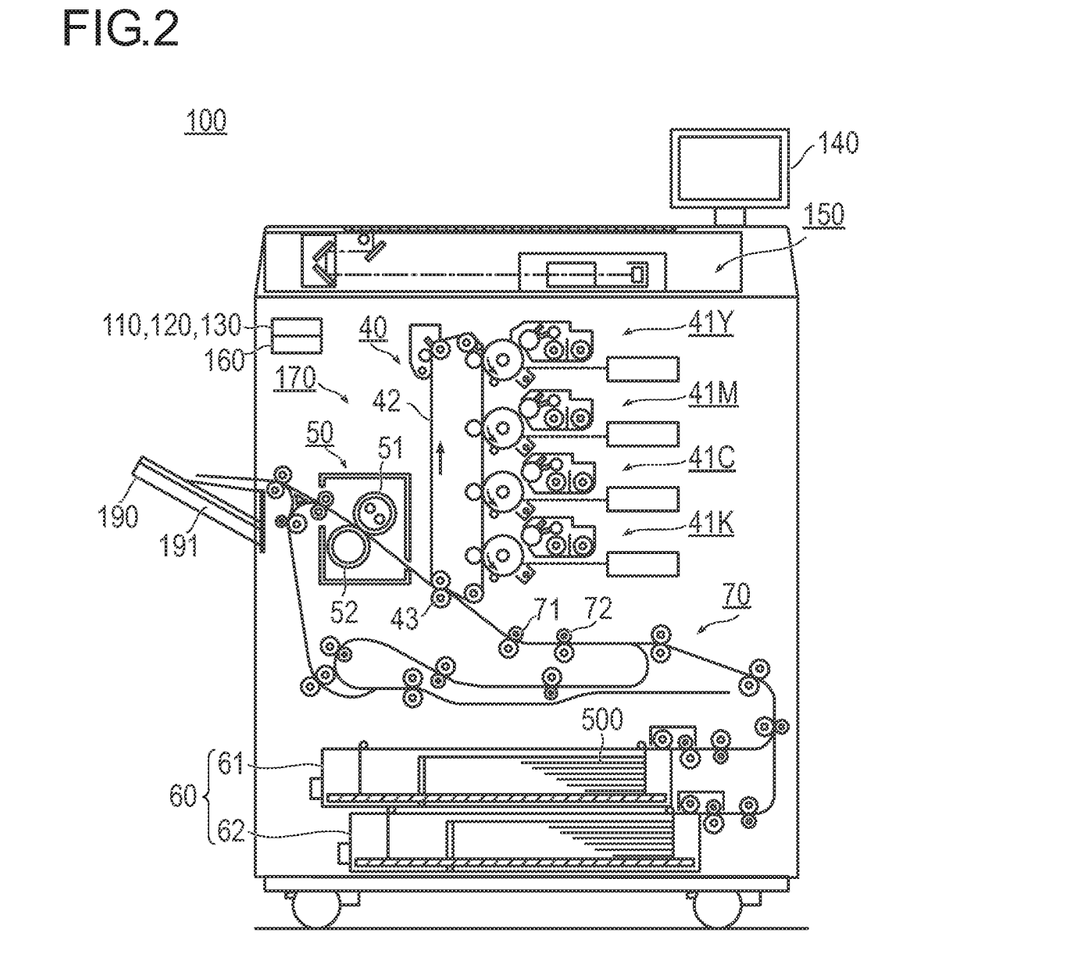
FIG. 2 is a schematic diagram illustrating a configuration of the image forming apparatus.
Figure 3:
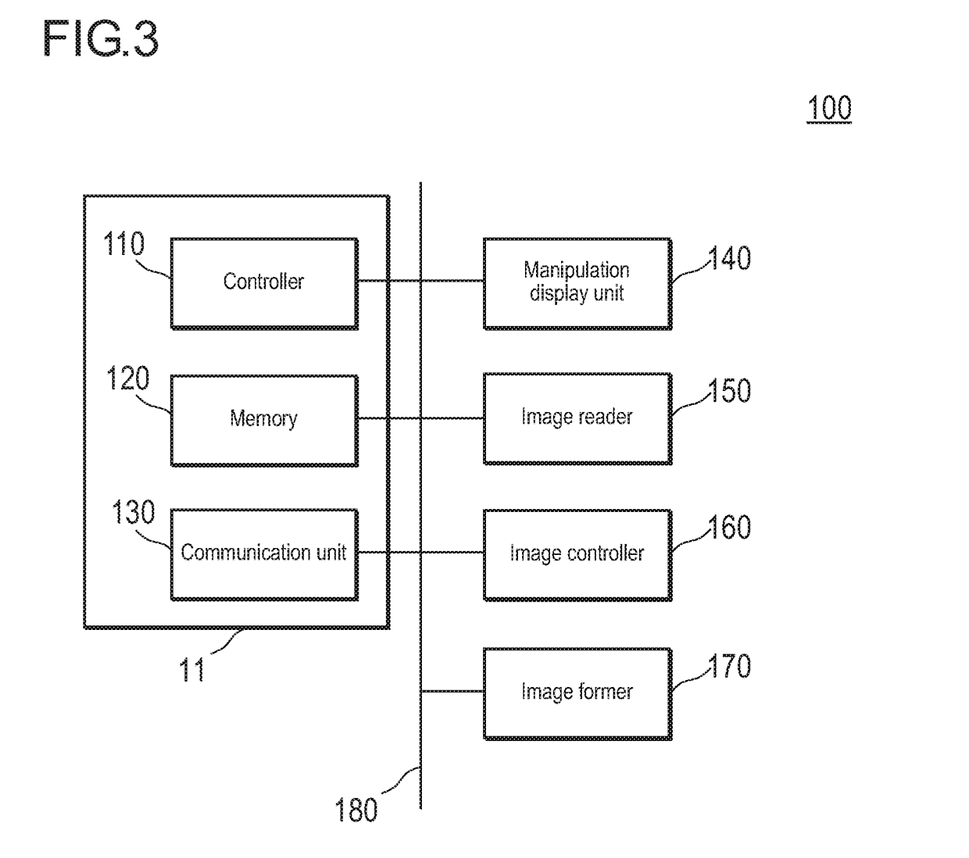
FIG. 3 is a block diagram illustrating the configuration of the image forming apparatus.

FIG. 2 is a schematic diagram illustrating a configuration of the image forming apparatus. FIG. 3 is a block diagram illustrating a configuration of the image forming apparatus.

The image forming apparatus 100 includes a controller 110, a memory 120, a communication unit (communicator) 130, a manipulation display unit 140, an image reader 150, an image controller 160, and an image former 170. These units are communicably connected to each other via a bus 180. The image forming apparatus 100 may include a MFP (multifunction peripheral). The controller 110, the memory 120, and the communication unit 130 constitute a recognition system 11.

The controller 110 includes a CPU (central processing unit) and various memories to perform controls of each unit described above depending on a program and various operation processings. The function of the controller 110 will be described below in details.

The memory 120 includes a SSD (solid state drive), a HDD (hard disc drive), or the like and stores various programs and various data.

The communication unit 130 is an interface for performing communication between the image forming apparatus 100 and external devices. The communication unit 130 includes a network interface based on a standard such as Ethernet (registered trademark), SATA, or IEEE1394. In addition, the communication unit 130 includes various local connection interfaces such as Bluetooth (registered trademark), a wireless communication interface such as IEEE802.11, and the like.

The manipulation display unit 140 includes a touch panel, a numerical pad, a start button, a stop button, and the like and is used to display various types of information and input various instructions.

The image reader 150 has a light source such as a fluorescent lamp and an imaging device such as a CCD (charge coupled device) image sensor. The image reader 150 applies light from the light source to a document set in a predetermined reading position, photoelectrically converts the reflected light using the imaging device, and creates image data from the electric signal.

The image controller 160 performs a layout processing and a rasterizing processing of the print data included in the print job received by the communication unit 130 to create image data having a bitmap format.

The image former 170 has an image former 40, a fixing unit 50, a sheet feeder 60, and a sheet conveyor 70.

The image former 40 has imaging units 41Y, 41M, 41C, and 41K corresponding to toners of respective colors of Y (yellow), M (magenta), C (cyan), and K (black). The toner images formed by respective imaging units 41Y, 41M, 41C, and 41K on the basis of the image data through charging, exposure, and development processes are sequentially superimposed on the intermediate transfer belt 42 and are transferred onto the sheet 500 by the secondary transfer roller 43.

The fixing unit 50 has a heating roller 51 and a pressing roller 52 and heats and pressurizes the sheet 500 conveyed to a fixing nip between both rollers 51 and 52 to melt and fix the toner images on the surface of the sheet 500.

The sheet 500 onto which the toner images are fixed by the fixing unit 50 is discharged to the sheet discharge tray 190 as the printed matter (output matter).

The sheet feeder 60 has a plurality of sheet feeding trays 61 and 62 to feed the sheets 500 stored in the sheet feeding trays 61 and 62 to the downstream side conveyance path one by one.

The sheet conveyor 70 has a plurality of conveyance rollers for conveying the sheet 500 and conveys the sheet 500 between the image creator 40, the fixing unit 50, and the sheet feeder 60. A plurality of conveyance rollers has a registration roller 71 for correcting a tilt of the sheet 500 or a loop roller 72 for forming a predetermined amount of loop on the sheet 500.

The sheet conveyor 70 discharges the sheet 500 on which an image is formed to the sheet discharge tray 190. A sensor 191 for detecting the printed matter is arranged on the sheet discharge tray 190. The sensor 191 constitutes a detector along with the controller 110. The sensor 191 is, for example, a weight sensor and can detect whether or not there is the printed matter on the sheet discharge tray 190 on the basis of detection information on a weight detected by the sensor 191.

The function of the controller 110 will be described in details.

Figure 4:
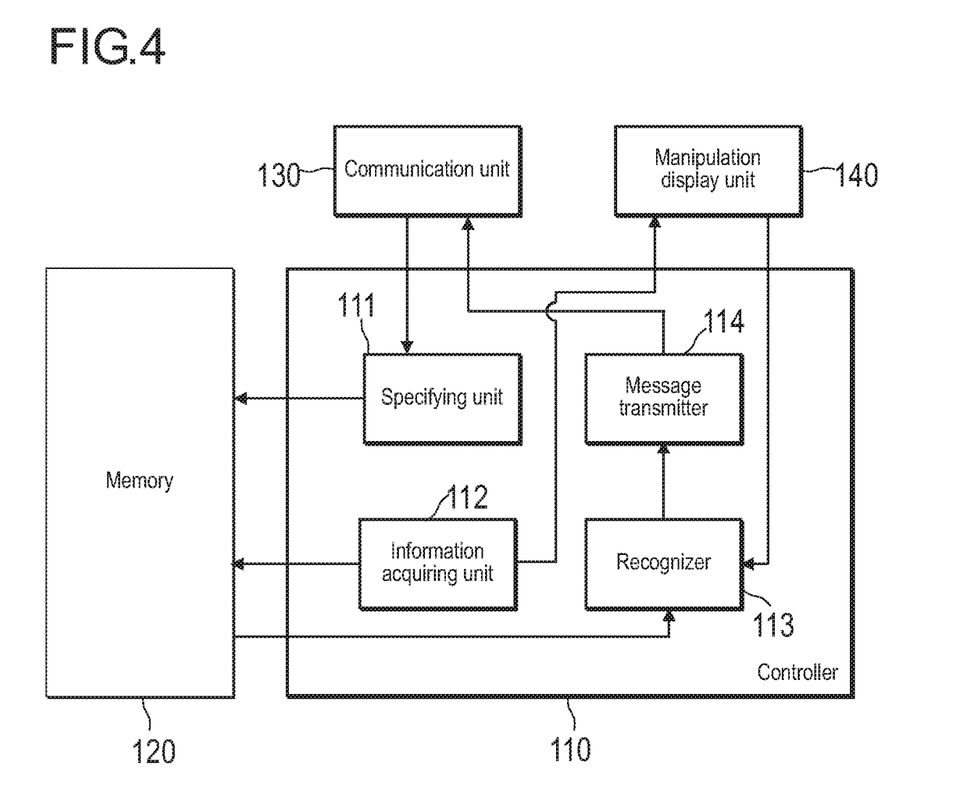
FIG. 4 is a block diagram illustrating functions of a controller of the image forming apparatus.

FIG. 4 is a block diagram illustrating the function of the controller of the image forming apparatus. Note that, for simple description purposes, blocks of the memory 120, the communication unit 130, and the manipulation display unit 140 are also illustrated in FIG. 4.

For example, user information regarding persons allowed to enter an office where the image forming apparatus 100 is disposed is registered in the memory 120. The user information includes, for example, (1) user ID, (2) authentication data, (3) name, (4) IP address or MAC address of mobile terminal, and (5) mail address of mobile terminal. In addition, the user information may also include a seat guide map in the user's office.

The specifying unit (specifier) 111 acquires information for specifying a user of the mobile terminal 300 paired with the communication unit 130 using a near field wireless system based on Bluetooth (registered trademark) or the like (hereinafter, referred to as "terminal information") via communication unit 130. The terminal information includes, for example, the IP address or the MAC address of the mobile terminal 300. The specifying unit 111 specifies a person who approaches the image forming apparatus 100 (hereinafter referred to as "particular person") on the basis of the acquired terminal information. A condition for specifying the particular person is that a distance between the person and the image forming apparatus 100 becomes equal to or shorter than a predetermined threshold. In other words, the specifying unit 111 specifies the person whose distance to the image forming apparatus 100 is equal to or shorter than the predetermined threshold as the particular person. The predetermined threshold can be set to an arbitrary distance as the maximum distance to the image forming apparatus 100 considered necessary for making contact with the printed matter on the sheet discharge tray 190. The predetermined threshold may be set to different values for each image forming apparatus 100.

The specifying unit 111 may set the condition for specifying the particular person including both a condition that the distance between the person and the image forming apparatus 100 becomes equal to or shorter than the predetermined threshold, and a condition that a period of time during which the distance between the person and the image forming apparatus 100 is equal to or shorter than the predetermined threshold is equal to or larger than a predetermined threshold. The threshold regarding the period of time is set to an arbitrary value corresponding to the minimum time considered necessary for approaching the printed matter on the sheet discharge tray 190, taking out the printed matter from the sheet discharge tray 190, and receding from the image forming apparatus 100.

The distance to the image forming apparatus 100 is calculated by photographing an omnidirectional image obtained by overlooking the entire office where the image forming apparatus 100 is installed using a surveillance camera such as a fisheye lens camera provided on a ceiling and visually recognizing the omnidirectional image. The distance to the image forming apparatus 100 may be detected using a GPS (global positioning system) function of the mobile terminal 300 or may be detected by using an embedded acceleration sensor in combination.

The specifying unit 111 may specify the user of the mobile terminal 300 as the particular person whose distance to the image forming apparatus 100 is equal to or shorter than the predetermined threshold on the basis of a fact that the communication unit 130 and the mobile terminal 300 are paired with each other. The specifying unit 111 may specify the particular person using at least any one of authentication data when logging in the image forming apparatus 100, and a photographic image of the surveillance camera that photographs a range including the image forming apparatus 100. The authentication data may include authentication data for at least any one of user authentication by using an ID card or entering an ID and a password, face authentication, and voice authentication. The specifying unit 111 may specify the user included in the authentication data or the user specified by the authentication data as the particular person. In addition, the particular person may be specified by image recognition of the photographic image of the surveillance camera.

The specifying unit 111 stores information on the particular person in the memory 120 in association with the user information corresponding to the particular person registered in the memory 120 in advance. The information on the particular person includes the IP address, the MAC address, or the like of the mobile terminal 300 used by the particular person, a timing at which the particular person is specified, and a timing at which the particular person is no longer specified. The IP address or the like of the mobile terminal 300 included in the user information registered in advance are compared with the IP address or the like included in the information on the particular person. If they match, the information on the particular person and the registered user information are stored in the memory 120 in association with each other. Hereinafter, the information on the particular person, and the user information corresponding to the particular person will be collectively referred to as "information regarding the particular person".

The information acquiring unit 112 acquires information regarding the particular person by reading it from the memory 120 on the basis of a user's instruction input to the manipulation display unit 140. This instruction is an instruction input by the user on a login screen when the user whose printed matter has been carried away logs in the image forming apparatus 100 through user authentication. Specifically, the instruction is an instruction for displaying a list of particular persons specified after executing the print job. The print job may be the last print job executed by the user specified on the basis of the authentication information in the user authentication. Note that a selection screen for allowing the user to select the print job whose printed matter has been carried away may be displayed such that the user can select the print job. The information acquiring unit 112 causes a list of the acquired information regarding the particular person to be displayed on the manipulation display unit 140. The list displayed on the manipulation display unit 140 includes, for example, a name of the particular person, a timing at which the user approaches the image forming apparatus (that is, a timing at which the particular person is specified), and a timing at which the user recedes from the image forming apparatus (that is, a timing at which the particular person is no longer specified) are displayed as the information regarding the particular person for each particular person. Note that a period of time for which the user approaches the image forming apparatus may be displayed in the list instead of the timing at which the user recedes from the image forming apparatus. The period of time for which the user approaches the image forming apparatus can be calculated on the basis of the timing at which the particular person is specified and the timing at which the particular person is no long specified. The information acquiring unit 112 may transmit the list of information regarding the acquired particular person to the mobile terminal 300 or the terminal 200 of the user who logs in the image forming apparatus 100 from the mobile terminal 300 or the terminal 200 through user authentication via the communication unit 130 and display the list.

The manipulation display unit 140 displays the list of information regarding the particular persons so that the user can select at least any of the information regarding the particular persons displayed on the list. As a result, any of the particular persons is designated by the user. In a case where the list of information regarding the particular persons is transmitted to the mobile terminal 300 or the terminal 200, at least any of the information regarding the particular persons displayed in the list is displayed such that the user can select it in the mobile terminal 300 or the terminal 200.

The recognizer 113 recognizes the particular person designated by the user by being selected by the user in the list of information regarding the particular persons, as a candidate who have carried away the printed matter of the user who logs in the image forming apparatus 100 (hereinafter, simply referred to as "candidate"). In a case where the list of information regarding the particular person is displayed on the mobile terminal 300 or the terminal 200, the recognizer 113 receives information regarding the particular person selected by the user via the communication unit 130. In this case, the recognizer 113 recognizes the particular person relating to the received information as the candidate who have carried away the printed matter of the user who logs in the image forming apparatus 100.

The recognizer 113 may recognize all the particular persons listed in the list of information regarding the particular persons as the candidates who have carried away the printed matter of the user logged in the image forming apparatus 100. In a case where the print job executed by the user logged in the image forming apparatus 100 is executed between a plurality of print jobs of another user, the recognizer 113 may recognize the other user among the particular persons listed in the list of information regarding the particular person as the candidate. This is because the printed matter by the print job executed between the print jobs of the same user could be erroneously carried away with a high probability. In addition, in a case where the print job executed by the user logged in the image forming apparatus 100 is executed between print jobs of another user who forms images on a predetermined number of pages or more, the recognizer 113 may recognize the other user among all the particular persons listed in the list of information regarding the particular person as the candidate. This is because the printed matter by the print job executed between print jobs for a relatively large number of pages could be erroneously carried away with a high probability. The predetermined number may be set to an arbitrary number considering a possibility of being carried away.

On the basis of the information regarding the particular person recognized as the candidate, the recognizer 113 acquires information necessary for notifying the candidates who have carried away the printed matter from the memory 120. The information necessary for notifying the candidate includes, for example, a name of the candidate, a mail address of the mobile terminal 300 carried by the candidate, and the like.

The message transmitter 114 constitutes a notificator along with the communication unit 130. The message transmitter 114 creates a message regarding a fact that the printed matter has been carried away on the basis of the information necessary for notifying the candidate acquired by the recognizer 113 and transmits the message to the candidate via the communication unit 130. The message regarding the fact that the printed matter has been carried away constitutes a message regarding a fact that the recording medium on which the image is formed by the image forming apparatus 100 has been carried away. The message regarding a fact that the printed matter has been carried away intercepted includes, for example, (1) a message inquiring whether or not you carry away the other person's printed matter, and (2) a request to deliver the printed matter to the user whose printed matter has been carried away. The "user whose printed matter has been carried away" included in the message of (2) is included in the information regarding the user whose printed matter has been carried away. The information regarding the user whose printed matter has been carried away includes, for example, a name, a position of the seat, and a seat guide map, of the user whose printed matter has been carried away.

The message regarding the fact that printed matter has been carried away include a message for asking for discard of the printed matter. For example, an instruction indicating that the printed matter is not necessary may be input by the user when the user selects the information regarding the particular person in the list of information regarding the particular person. In this case, the message regarding the fact that printed matter has been carried away is the message for asking for discard of the printed matter. Even when the user executes the same print job as the print job of the printed matter that is passed away, the message regarding the fact that the printed matter has been passed away may be regarded as the message for asking for discard of the printed matter.

In addition, the recognizer 113 may recognize the candidate and the user whose printed matter has been carried away as described below.

The recognizer 113 detects whether or not there is the printed matter on the sheet discharge tray 190 on the basis of a detection result of a weight of the printed matter using the sensor 191 arranged in the sheet discharge tray 190. In a case where the particular person specified by the specifying unit 111 while the printed matter is detected after the print job is executed, and the printed matter is then no longer detected is different from the user who executed this print job, the recognizer 113 recognizes the user who executed this print job as the user whose printed matter has been carried away. In addition, this particular person is recognized as the candidate.

In a case where the same print job as the already executed print job is executed while the printed matter on the sheet discharge tray 190 is not detected, the recognizer 113 recognizes the user who executed this print job as the user whose printed matter has been carried away. In this case, the message transmitter 114 notifies the message regarding the fact that the printed matter has been carried away including the information regarding the recognized user whose printed matter has been carried away to the candidate.

In a case where a new printed matter is detected on the sheet discharge tray 190 while no print job is executed, the recognizer 113 recognizes the user who executed the print job by which an image is formed on the newly detected printed matter on the basis of the detection result of the printed matter using the sensor 191. For example, the recognizer 113 compares the weight calculated on the basis of the sheet type or the number of copies set in the print setting included in the print job with the weight of the printed matter detected by the sensor 191. As a result, it is possible to specify the print job by which the image has been formed on the newly detected printed matter, and recognize the user who executed the print job. The recognizer 113 notifies the information on the candidates to the recognized user via the communication unit 130. In this case, the candidate may be the particular person specified when the new printed matter is detected.

Figure 5:
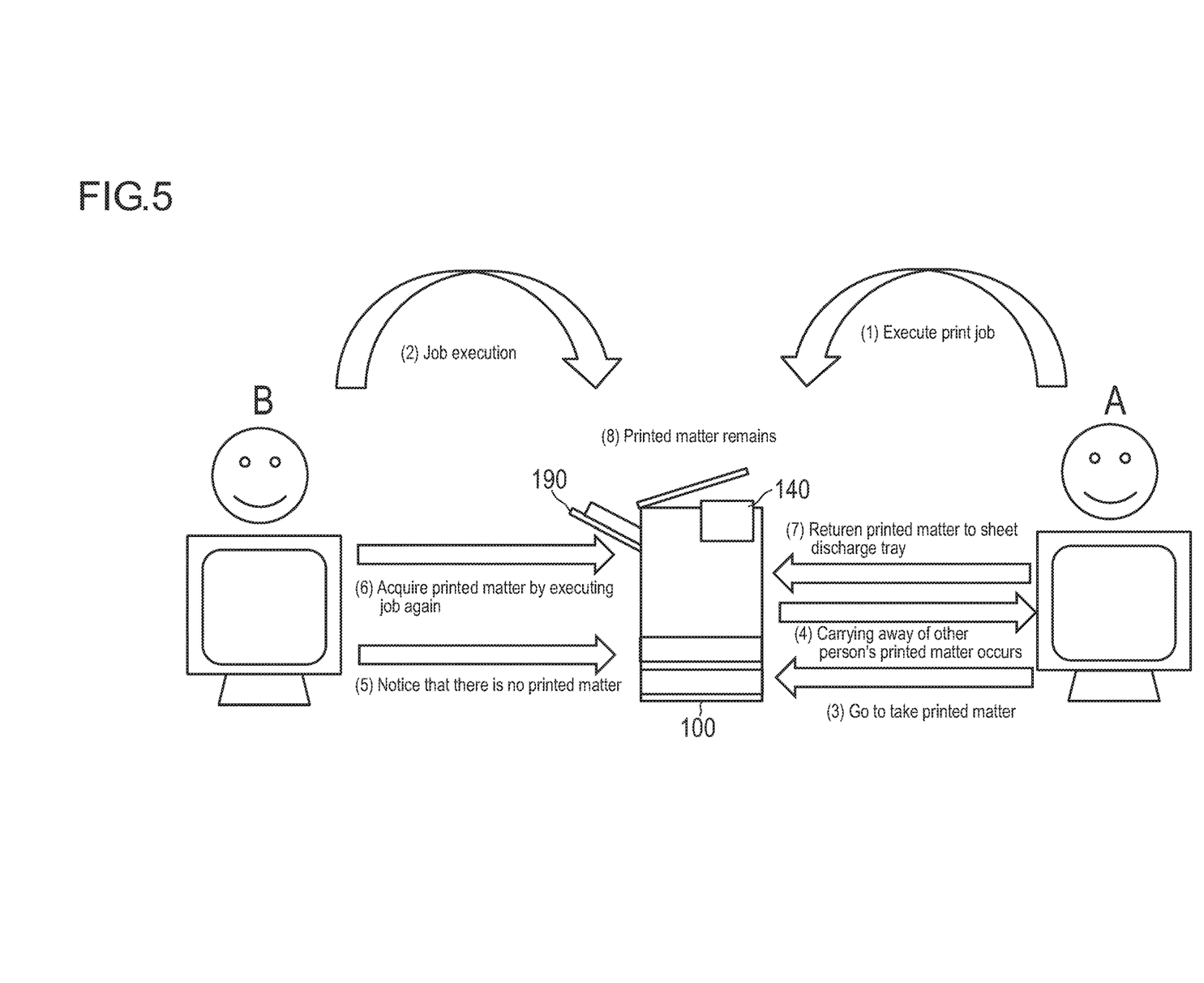
FIG. 5 is an explanatory diagram for describing a case where the printed matter of other person is carried away.

FIG. 5 is an explanatory diagram for describing a case where the printed matter of the other person is carried away.

In FIG. 5, it is assumed that the user A and the user B transmit the print jobs from the terminals A and B, respectively, to the same image forming apparatus 100 in order to output the printed matter.

In this case, the user A carries away the printed matter of the user B, and then notices that the user A carries away the other person's printed matter. The user A returns the printed matter of the user B to the sheet discharge tray 190. As a result, the printed matter of the user B remains. That is, (1) the user A executes the print job by transmitting the print job from the terminal A to the image forming apparatus 100. Then, (2) the user B executes the print job by transmitting the print job from the terminal B to the image forming apparatus 100. Then, (3) the user A goes to the sheet discharge tray 190 in order to take his own printed matter. Then, (4) the user A takes and comes back the printed matter of the user B as the other person, output on the same sheet discharge tray as well as his own printed matter, so that carrying away of the printed matter of the user B occurs. Then, (5) the user B notices that there is no printed matter of the user B in the sheet discharge tray 190. Then, (6) the user B acquires his own printed matter by executing the print job again. Then, (7) the user A notices that he carried away the printed matter of the user B as the other person, and returns the printed matter of the user B to the sheet discharge tray 190. In this case, since the user B has already acquired his own printed matter, (8) the printed matter of the user B remains in the sheet discharge tray 190.

Figure 6:
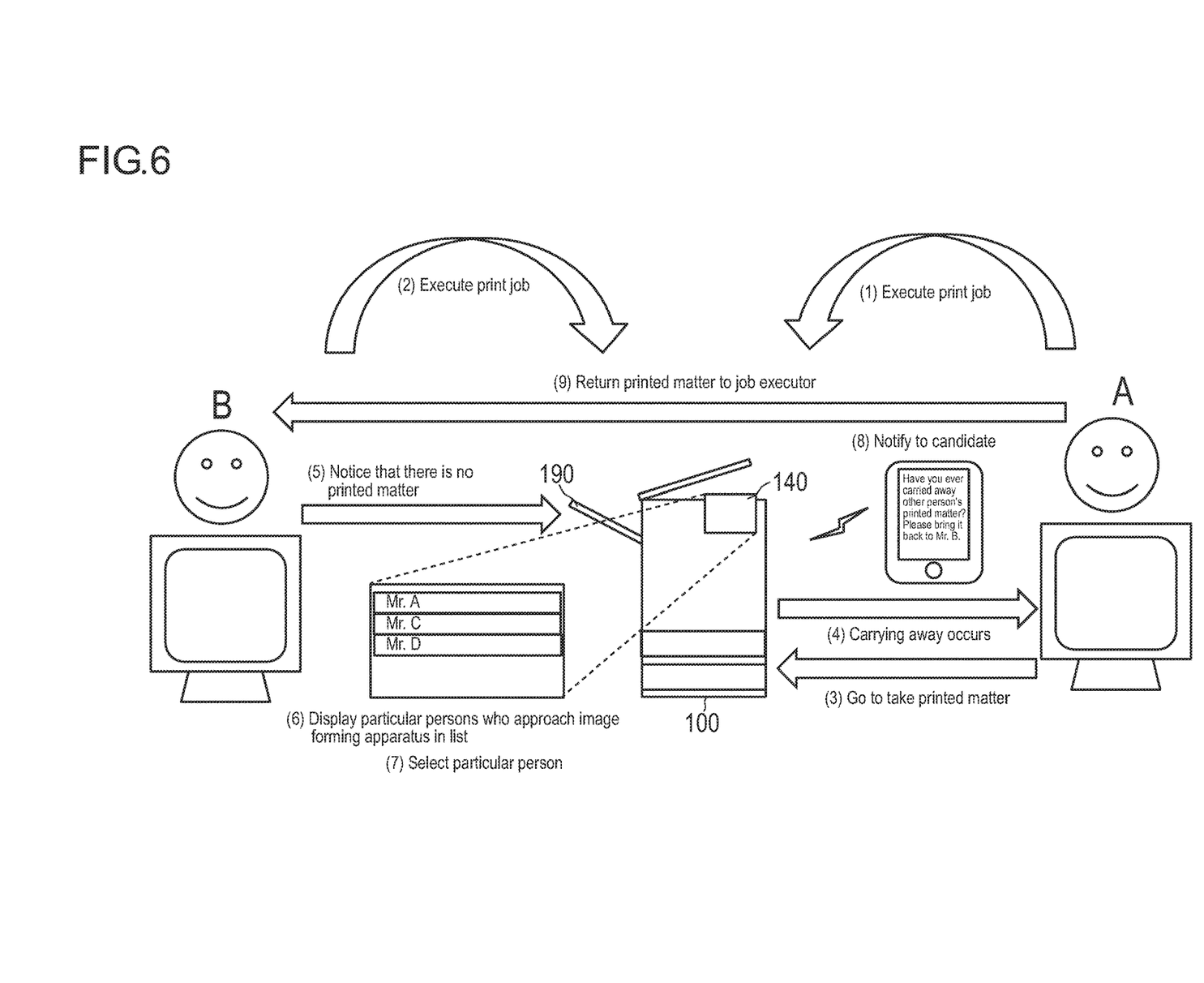
FIG. 6 is an explanatory diagram for describing an example of specifying a user who carries away the other person's printed matter using the recognition system and urging the user to return it to the other person.

FIG. 6 is an explanatory diagram for describing an example of specifying the user who intercepted the other person's printed matter using the recognition system and urges the user to return it to the other person. Note that, even in the example of FIG. 6, similar to the case of FIG. 5, it is assumed that the user A and the user B transmit print jobs to the same image forming apparatus 100 from the terminal A and the terminal B, respectively, to output the printed matter.

(1) The user A executes the print job by transmitting the print job from the terminal A to the image forming apparatus 100. Then, (2) the user B executes the print job by transmitting the print job from the terminal B to the image forming apparatus 100. Then, (3) the user A goes to the sheet discharge tray 190 to take his own printed matter. Then, (4) the user A takes and come backs the printed matter of the user B as the other person, output in the same sheet discharge tray, as well as his own printed matter, so that carrying away of the printed matter of the user B occurs. Then, (5) the user B notices that his own printed matter does not exist in the sheet discharge tray 190.

Then, (6) the user B logs in the image forming apparatus 100, and instructs to display the list of information regarding particular persons specified after executing the print job on the login screen. As a result, the list of information regarding particular persons is displayed on the manipulation display unit 140. In the example of FIG. 6, as the information regarding particular persons, names of the particular persons are displayed (such as "Mr. A", "Mr. B", and "Mr. C"). Then, (7) the user B selects at least any one of the information regarding particular persons as a candidate. Then, (8) the message regarding the fact that the printed matter has been carried away is notified to each candidate from the image forming apparatus 100. As the message regarding the fact the printed matter has been carried away, a message "Have you carried away other person's printed matter? Please bring it back to Mr. B." is notified. As a result, it is possible to inform the user A as the candidate that there is a possibility of carrying away of the printed matter of the user B as the other person and urge the user A to return the printed matter to the user B. Therefore, (9) the user A can return the intercepted printed matter to the user B who executed the print job.

The controller 110 may further have a function of notifying that there is the possibility of carrying away of the printed matter by the print job before the print job is executed to an executor of the print job (more specifically, the user who, for example, transmits the print job to the image forming apparatus).

In a case where the single print job is executed between other print jobs that form images on a predetermined number of pages or more, the controller 110 notifies that there is the possibility of carrying away of the printed matter formed the image and output by executing the single print job to the executor of the single print job before the single print job is executed. As a result, it is possible to alert the executor of the print job by notifying that there is the possibility of carrying away of the printed matter before execution of the print job.

In a case where the single print job is executed between other print jobs of the same user, the controller 110 notifies that there is the possibility of interception of the printed matter output by executing the single print job to the executor of the single print job. As a result, it is possible to alert the executor of the print job by notifying that there is the possibility of carrying away of the printed matter before execution of the print job.

The operation of the recognition system 11 will be described. Note that, since the recognition system 11 is integrated into the image forming apparatus 100 as described above, the operation of the recognition system 11 will be described as the operation of the image forming apparatus 100.

Figure 7:
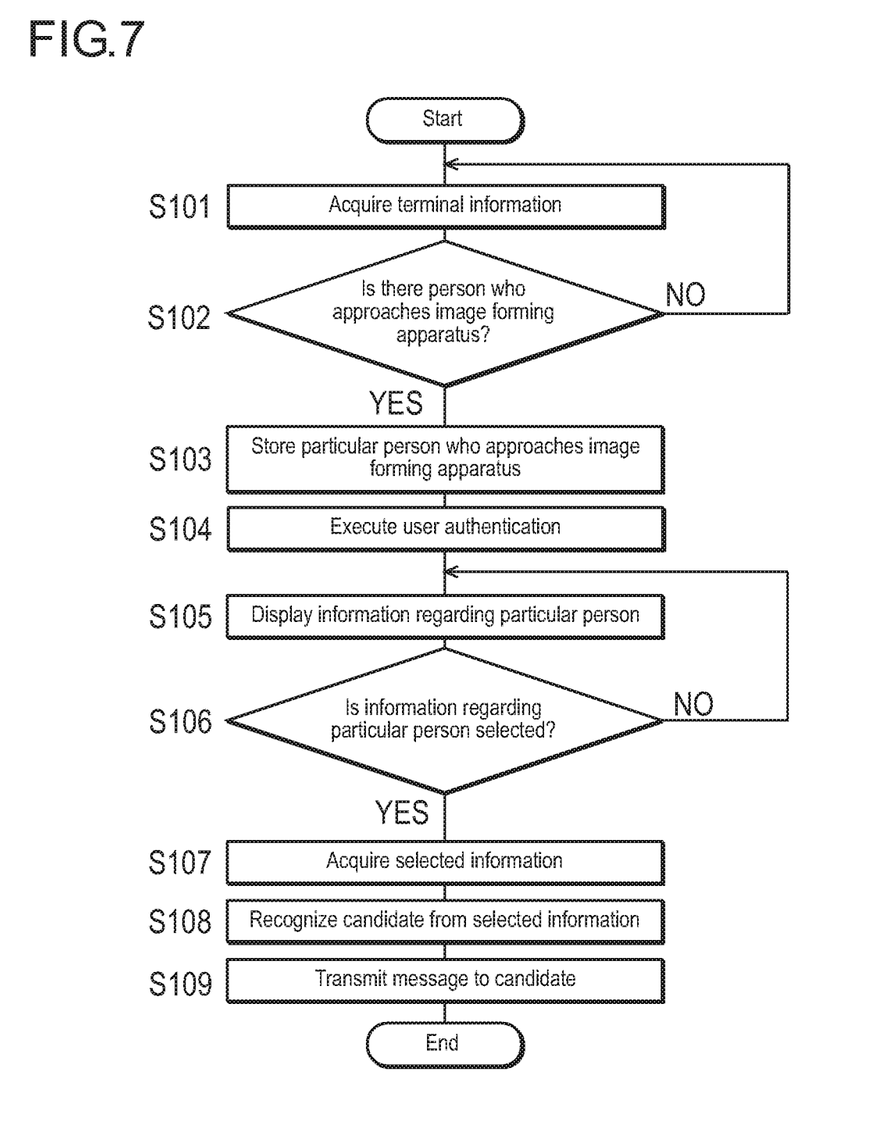
FIG. 7 is a flowchart illustrating operations of the recognition system.

FIG. 7 is a flowchart illustrating the operation of the recognition system. This flowchart may be executed by the controller 110 of the image forming apparatus 100 depending on the program.

The print job is executed as the user transmits the print job from the terminal 200 or the mobile terminal 300 to the image forming apparatus 100.

The controller 110 acquires the terminal information of the mobile terminal 300 paired with the communication unit 130 using the near field wireless system (S101).

The controller 110 determines whether or not there is the person who approaches the image forming apparatus 100 (S102). That is, the controller 110 determines whether or not the particular person whose distance to the image forming apparatus 100 is equal to or shorter than the predetermined threshold has been specified.

The controller 110 repeatedly executes steps S101 to S102 if no particular person is specified (S102: NO).

If the particular person is specified (S102: YES), the controller 110 stores the particular person in the memory 120 (S103). Note that, even when the single particular person is specified, other particular persons are repeatedly specified by repeatedly executing steps S101 to S102.

Here, while steps S101 to S103 are processed, it is assumed that the other person carries away the printed matter. Then, the user who executed the print job notices that there is no printed matter, that is, the printed matter has been carried away erroneously.

The controller 110 executes user authentication in response to the request of user authentication from the user whose printed matter has been carried away (S104).

The controller 110 specifies the print job executed by the user from the authentication data. The controller 110 causes the manipulation display unit 140 to display the list of information regarding the particular persons specified after execution of the specified print job such that the user can select at least any one of the information regarding the particular persons (S105).

The controller 110 determines whether or not the information regarding particular persons is selected from the displayed list (S106).

If it is determined that the information regarding the particular person is not selected (S106: NO), the controller 110 repeatedly executes steps S105 to S106.

If it is determined that the information regarding the particular person is selected (S106: YES), the controller 110 acquires information regarding the selected particular person from the manipulation display unit 140 (S107).

The controller 110 recognizes the particular person selected from the information regarding the particular person as the candidate of the person who carried away the user's printed matter (S108).

The controller 110 transmits the message regarding the fact that the printed matter has been carried away to the candidate via the communication unit 130 (S109).

This embodiment has the following effects.

The person who approaches the image forming apparatus is specified, any of the specified persons is recognized as the candidate of carrying away the printed matter, and the message is notified to the candidate. As a result, it is possible to specify the person having a possibility of carrying away the other person's printed matter without omission, urge return of the printed matter, and the like.

In addition, the person designated by the user whose printed matter has been carried away out of the specified persons is recognized as the candidate, and the message is notified including information regarding the user whose printed matter has been carried away. As a result, it is possible to urge the person who has a high possibility of carrying away the printed matter to return the printed matter to an owner.

Further, the notification system is integrate into the image forming apparatus, and the condition for specifying the person who approaches the image forming apparatus is set for each image forming apparatus. As a result, it is possible to flexibly respond to an arrangement environment of the image forming apparatus, and suitably widen a range for specifying the person having the possibility of carrying away the printed matter.

Further, the person who has the distance to the image forming apparatus equal to or shorter than the predetermined threshold is specified as the man who approaches the image forming apparatus. As a result, it is possible to flexibly set the range for specifying the person having the possibility of carrying away the printed matter.

Further, the person who approaches the image forming apparatus is specified using any of the authentication data when logging in the image forming apparatus and the photographic image of the surveillance camera that captures the range including the image forming apparatus. As a result, it is possible to flexibly set a range of specifying the person having the possibility of carrying away the printed matter depending on the arrangement environment of the image forming apparatus.

Further, the person who approaches the image forming apparatus is specified using the authentication data when logging in the image forming apparatus by at least any one of face authentication and voice authentication. As a result, it is possible to flexibly cope with the method of specifying the person who has the possibility of carrying away the printed matter.

Further, the list of information regarding persons specified as the person who approaches the image forming apparatus is displayed such that at least any of the information on the list can be selected by the user. In addition, the person relating to the selected information is recognized as the candidate. As a result, it is possible to more easily specify the person who has high possibility of carrying away the printed matter.

Further, the person whose distance to the image forming apparatus is equal to or shorter than the predetermined threshold is specified as the person who approaches the image forming apparatus, and the list contains at least any of the timing at which the distance becomes equal to or shorter than the predetermined threshold and the period of time for which the distance is equal to or shorter than the threshold as information regarding the person. As a result, it is possible to appropriately specify the candidate by providing the additional information for specifying the candidate who has carried away the printed matter to the user.

Further, the list of information regarding the persons specified as approaching the image forming apparatus is transmitted to the terminal of the user who executed the print job, and the list is displayed on the terminal such that said user can select at least any of said information displayed on said list. In addition, the selected information is received from the terminal, and the person regarding the information is recognized as the candidate. As a result, it is possible to specify the person having the high possibility of carrying away the printed matter without occupying the image forming apparatus.

Further, the printed matter discharged to the sheet discharge tray is detected. The person specified while the printed matter is detected after the print job is executed, and the printed matter is then no longer detected is different from the user who executed this print job, the user who executed this print job is recognized as the user whose printed matter has been carried away. In addition, the person specified while the printed matter is detected after the print job is executed, and the printed matter is then no longer detected, is recognized as the candidate. As a result, it is possible to cope with the case where the user whose printed matter is carried away does not notice the fact that print patter is carried away.

In the case where the same print job as that already executed print job is executed while no printed matter is detected in the sheet discharge tray, the user who executed the print job is recognized as the user whose printed matter is carried away. As a result, it is possible to specify the user whose printed matter is carried away with high accuracy.

In the case where the new printed matter is detected while no print job is executed, the user who executed the print job for forming the image in the printed matter is recognized on the basis of the newly detected printed matter, and the person specified at the time of detection of the new printed matter is recognized as the candidate. In addition, the recognized user is notified of the message including information regarding the recognized candidate. As a result, it is possible to provide the material of determination for specifying the person who has carried away the other person's printed matter.

The information regarding the user included in the message notifying the candidates contains the seat guide map of the user. As a result, the user whose printed matter is carried away can more reliably receive the printed matter.

In the case where there is an instruction from the user that the printed matter on which the image is formed by the print job is not necessary, or in a case where the same print job as the print job is executed, the message indicating that discard of the printed matter is desired is notified. As a result, it is possible to cope with a case where the printed matter becomes unnecessary when the user has already printed the printed matter again or the like.

In the case where the print job of the user is executed between other print jobs for forming images on the predetermined number of pages or more, the fact that there is the possibility that the printed matter generated by the print job can be carried away is notified to the user before this print job is executed. As a result, it is possible to prevent carrying away of the printed matter in advance.

In the case where the print job from the user is executed between other print jobs from the same user, the fact that there is the possibility of carrying away the printed matter of the print job is notified to the user before the print job is executed. As a result, it is possible to prevent carrying away of the printed matter in advance.

The present invention is not limited to the aforementioned embodiments.

For example, a part or all of the processings executed by the program in the aforementioned embodiments may be substituted with and executed by hardware such as circuits.

Although embodiments of the present invention have been described and illustrated in detail, the disclosed embodiments are made for purpose of illustration and example only and not limitation. The scope of the present invention should be interpreted by terms of the appended claims.

What is claimed is:

1. A recognition system of a person carrying away an output matter of an image forming apparatus, comprising:
 a controller that operates as a specifier that specifies specified persons when a distance of each of said specified persons to said image forming apparatus becomes equal to or shorter than a predetermined threshold as said each of said specified persons approaches said image forming apparatus;
 a memory that stores said specified persons;
 said controller further operating as a recognizer that recognizes at least one of said specified persons stored in said memory as a candidate who has carried away an output matter on which an image is formed by said image forming apparatus on the basis of a user's print job; and
 said controller further operating as a message transmitter that creates a message regarding a fact that said output matter on which the image is formed by said image forming apparatus has been carried away for transmission to said candidate recognized by said recognizer.

2. The recognition system according to claim 1,
 wherein said at least one of said persons recognized by said recognizer as said candidate is designated by said user whose output matter has been carried away out of said persons stored in said memory, and
 said message created by said message transmitter includes information regarding said user whose output matter has been carried away.

3. The recognition system according to claim 2,
 wherein information regarding said user includes a seat guide map of said user.

4. The recognition system according to claim 1,
 wherein said recognition system is integrated into plural image forming apparatuses,
 a condition of said specifier for specifying said specified persons is set by the user for each of said image forming apparatuses.

5. The recognition system according to claim 1,
 wherein said specifier specifies the specified persons who approach said image forming apparatus using at least any of authentication data when logging in said image forming apparatus and a photographic image of a surveillance camera that photographs a range including said image forming apparatus.

6. The recognition system according to claim 5,
 wherein said specifier specifies the specified persons who approach said image forming apparatus using authentication data when logging in said image forming apparatus including at least any of face authentication and voice authentication.

7. The recognition system according to claim 1,
 further comprising a display that displays a list of information regarding said specified persons such that the user can select at least any of said information displayed on said list,
 wherein said recognizer recognizes said at least one of said specified persons based on said information selected by said user as said candidate.

8. The recognition system according to claim 7,
 wherein
 said list contains, as the information regarding said specified persons, at least any of a timing at which said distance becomes equal to or shorter than said predetermined threshold and a period of time for which said distance is within a range equal to or shorter than said predetermined distance.

9. The recognition system according to claim 1, further comprising a communicator that transmits a list of information regarding said specified persons to a terminal of a user who executed said print job, displays the list on the terminal such that said user can select at least any of said information displayed on said list, and receives said information selected by said user from said terminal, wherein said recognizer recognizes said at least one of said specified persons regarding said information received from said terminal as said candidate.

10. The recognition system according to claim 1, further comprising a detector that detects said output matter on which the image is formed discharged to a sheet discharge tray, wherein, in a case where one of said specified persons different from a user who executed said print job is specified by said specifier while said output matter is detected by said detector after said print job is executed and while said output matter is then no longer detected, said recognizer recognizes said user who executed said print job as a user whose output matter has been carried away and said recognizer recognizes, as said candidate, said one of said specified persons.

11. The recognition system according to claim 1, further comprising a detector that detects said output matter on which the image is formed discharged to a sheet discharge tray, wherein, in a case where the same print job as said already executed print job is executed while said output matter is not detected by said detector, said recognizer recognizes a user who executed said print job as said user whose output matter has been carried away, and said message created by the message transmitter includes information regarding said recognized user whose output matter has been carried away.

12. The recognition system according to claim 1, further comprising a detector that detects said output matter on which the image is formed discharged to the sheet discharge tray, wherein, in a case where said output matter is newly detected by said detector while said print job is not executed, said recognizer recognizes said user who executed the print job for forming an image on said newly detected output matter on the basis of a detection result of said detector, and recognizes, as said candidate, said person specified by said specifier when said output matter is newly detected by said detector, and said message created by the message transmitter includes information regarding said candidate recognized by said recognizer to said user recognized by said recognizer.

13. The recognition system according to claim 1, wherein, in a case where said user who executed said print job instructs that said output matter on which the image is formed by said print job is unnecessary, or in a case where the same print job as said print job is executed, said message created by the message transmitter indicates that discard of said output matter is desired.

14. The recognition system according to claim 1, wherein, in a case where said print job is executed by a user between other print jobs that form images on a predetermined number of pages or more, said message created by the message transmitter indicates that there is a possibility that said output matter on which an image is formed by executing said print job is carried away, to said user who executed said print job.

15. The recognition system according to claim 1, wherein, in a case where said print job is executed by a user between a plurality of print jobs by another user, said message created by the message transmitter indicates that there is a possibility that said output matter on which the image is formed by executing said print job is carried away, to said user before executing said print job.

16. A recognition method of a person carrying away an output matter of an image forming system, the method comprising:
   (a) specifying specified persons when a distance of each of said specified persons to said image forming apparatus becomes equal to or shorter than a predetermined threshold as said each of said specified persons approaches said image forming apparatus;
   (b) storing said specified persons in a memory;
   (c) recognizing at least one of said specified persons stored in the memory as a candidate who has carried away an output matter on which an image is formed by an image forming apparatus on the basis of a print job of a user; and
   (d) creating a message regarding a fact that said output matter has been carried away for transmission to said candidate.

17. A non-transitory computer-readable storage medium storing a recognition program of a person carrying away an output matter of an image forming apparatus, the program causing a computer to perform:
   (a) specifying specified persons when a distance of each of said specified persons to said image forming apparatus becomes equal to or shorter than a predetermined threshold as said each of said specified persons approaches said image forming apparatus;
   (b) storing said specified persons in a memory;
   (c) recognizing at least one of said specified persons stored in the memory as a candidate who has carried away an output matter on which an image is formed by an image forming apparatus on the basis of a print job of a user; and
   (d) creating a message regarding a fact that said output matter has been carried away for transmission to said candidate.

* * * * *